Jan. 11, 1955

W. C. BEAN 2,699,329

COUNTERWEIGHT FOR TESTING THE SCALES
OF EGG-GRADING MACHINES

Filed July 17, 1950

INVENTOR:
W. C. Bean,
BY
O O Martin
Attorney.

United States Patent Office 2,699,329
Patented Jan. 11, 1955

2,699,329
COUNTERWEIGHT FOR TESTING THE SCALES OF EGG-GRADING MACHINES

William C. Bean, Glendale, Calif.

Application July 17, 1950, Serial No. 174,244

2 Claims. (Cl. 265—60)

This invention relates to egg-grading machines and has particular reference to devices for testing the accuracy of the weighing scales generally used in this type of machines.

It is common practice at the present time to sell eggs over the counter in dozen lots packed in light cartons, the eggs of each carton being graded to a certain predetermined weight, several grades being ordinarily used and variously designated, such as light, medium, large and jumbo. The grading machines used generally include a conveyor on to which eggs are fed, one by one, to be carried over a series of grading scales which are so adjusted that they will yield when an egg of the weight to which they are adjusted reaches the platform or tray of the scales and, in yielding, to deposit the egg on a conveyor or into a chute for transfer of the egg to the packing department.

Each of the scales of the grading machine is made adjustable and it is from time to time necessary to check the adjustment of the scales to make certain that vibrations or other outside influences may not have disturbed the adjustment thereof. For the purpose of such readjustment, it is customary to use some form of standard weight, usually termed a counter-weight or counter-poise, which is manually placed on the scale to check the accuracy thereof. Such counter-weights have, however, not been found suitable for use in egg grading machines of the type referred to because the weight indication obtained by manually placing the counter-weight on the scales varies considerably from the weight indication obtained when a moving egg reaches and rolls on to the scales, the difference being so considerable that test by such manually placed counter-weight is inconclusive.

It is in view of the foregoing the general object of the present invention to provide a counter-weight of a type, shape and construction suitable for use in egg-grading machines in the same manner that eggs to be graded are fed through the machine. To this end the invention resides in the combinations hereinafter fully described and reference is invited to the accompanying drawing in which preferred forms of the invention are illustrated.

A scale testing device for use in egg-grading machines of the type above referred to must in size and shape closely resemble the products which the machine is designed to grade and it may in its simplest form consist of an artificial egg made from material of the proper weight and of such nature that it will not materially be affected by atmospheric conditions. It has been suggested to use wood in the construction of such counter-weight and this material might be found acceptable if it could be supplied with a cover or plating of a moisture and temperature resisting composition. A rubber or plastic composition might be found acceptable for the purpose of such counter-weight manufacture. However, the difficulty with this type of construction is that, due to frequent rough handling, the surface of the counter-weight may soon become so badly worn that the reduction in weight will render the device unsuitable for grading scale checking purposes.

Figure 1:
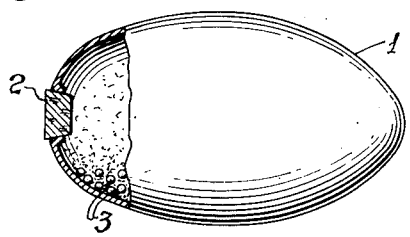
Fig. 1 is a side elevational view of a counter-weight embodying the invention.

A more satisfactory manner of constructing a counter-weight for a grading machine scales is indicated in Fig. 1 of the drawing. This device consists of a shell 1 which is made from thin material such as a suitable ceramic, plastic or metallic composition which is wear resistant and somewhat lighter than the required standard weight. The shell is at one end thereof shown provided with an opening in which a suitable stopper 2 is placed but it becomes necessary before the stopper is applied to the shell to insert a quantity of small objects, such as balls 3, of sufficient number into the shell to bring the device up to the required standard weight. The stopper which, of course, is included in building up the counter-weight to standard, is then put back in position and the counter-weight is ready for use. As above stated, the manner of using the counter-weights in a grading machine is to place them on the conveyor or chute leading into the machine and permit them to roll on to it to be carried through the machine in the same manner that the eggs to be graded are fed therethrough. When each weight reaches the scale it is designed to test, the operator will be in position to observe whether the scale has remained in correct position of adjustment.

Where the specific gravity of the objects placed within the shell is considerable, it will only be found necessary partly to fill the shell and it may be found that for this reason, the rolling and shifting motion of the objects within the shell as the counter-weight is fed through the machine on to the scales may have a tendency to disturb the accuracy of the device. If this is found to be so, it may be found advisable fairly completely to fill the remaining space within the shell with a lighter, lanuginous substance. Another suitable material is sawdust; but where the shell is of the proper consistency and of approximately the correct weight, it will only be necessary to place very few such objects therein and all danger of the shifting movement of the objects affecting the correctness of the test will be eliminated.

The advantage of this arrangement is that only one size of shell is required and that the volume of the filler material added determines the standard weight of the shell.

It is, of course, to be noted that each counter-weight will bear on the surface thereof marks indicating the standard weight it represents.

Figure 2:
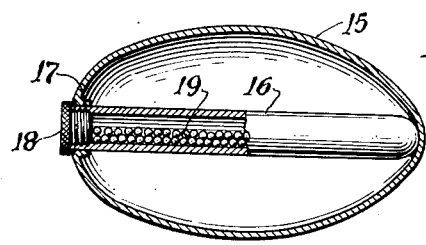
Fig. 2 is a similar view illustrating a modification of the structure shown in Fig. 1.

The device illustrated in Fig. 2 of the drawing includes a shell 15 which may remain substantially like the shell 1 above described, except that a slender, tubular member 15 has been inserted through the opening 17 of the shell to extend to the other end thereof and this member may, by means of a suitable adhesive composition, be permanently fastened in position within the opening 17. A similar composition may be applied to the inner end of the member at the time it is mounted in position more securely to anchor this closed end of the member within the shell. The open end of the member is shown internally threaded to receive a screw plug 18 by means of which the entrance thereto may be tightly sealed or, if preferred a stopper, such as shown in Fig. 1 of the drawing, may be substituted to prepare this device for use. It is merely required to insert the proper number of small objects 19 therein and the counter-weight may be used to check the scales from time to time as required, for an indefinite period of time. Since the member 16 can be of very small diameter, the shifting and rolling movement of the objects therein will not be sufficient to affect the accuracy of the scale checking operation.

Figure 3:
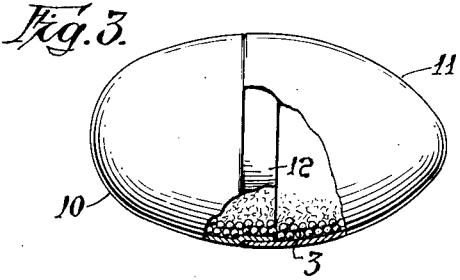
Figs. 3 and 4 illustrate further modifications, the importance whereof is hereinafter fully explained.
Figure 4:
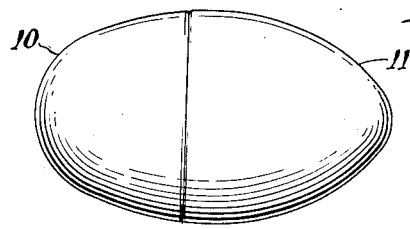

As an alternative construction I have, in Fig. 3, shown the shell made in two parts, 10, 11, one of which is fitted with a flange 12 of a size to engage the inner surface of the other part in the manner that the lid of a box ordinarily is placed in position on the flanged bottom portion thereof. When the same types of fillers 3 are placed within this device to build it up to the correct weight, it will be ready for use in the testing of grading machine scales and it will be a simple manner from time to time, if necessary, to add to the filler therein to insure continued dependable use thereof. When the device is carefully made and correctly assembled, nothing will be present to obstruct or hinder the advance of the counter-weight through the machine and it is a very simple matter to separate the parts of the shell for readjustment of the filler therein.

I claim:

1. A counter-weight for testing the egg weighing scales of an egg grading machine, said counter-weight comprising a shell of the size and shape of the eggs to be weighed on the scales but somewhat lighter than the required standard weight, a closure for said shell, granular material of high specific gravity within the shell, there being a sufficient quantity of said material in the shell to produce the required standard weight, and light lanuginous material mixed in with said granular material.

2. A counter-weight for testing the egg weighing scales of an egg grading machine, said counter-weight comprising a shell of the size and shape of the eggs to be weighed on the scales but somewhat lighter than the required standard weight, said shell having an opening in one end thereof, granular material of high specific gravity placed within the shell of sufficient volume to produce the required standard weight, light lanuginous material intermixed with said granular material, and a cover for said opening.

References Cited in the file of this patent

UNITED STATES PATENTS

| | | |
|---|---|---|
| 70,531 | Comstock | Nov. 5, 1867 |
| 465,133 | Hitchcock | Dec. 15, 1891 |
| 496,716 | Benitez | May 2, 1893 |
| 1,038,190 | Olsen | Sept. 10, 1912 |
| 1,383,838 | Mrazek | July 5, 1921 |
| 1,388,094 | Buttigieg | Aug. 16, 1921 |
| 1,532,136 | Graf | Apr. 7, 1925 |